US006425948B1

(12) United States Patent
Nowak et al.

(10) Patent No.: US 6,425,948 B1
(45) Date of Patent: Jul. 30, 2002

(54) SOLVENT-BASED FLUORESCENT INKS FOR WRITING INSTRUMENTS BASED UPON PIGMENT DISPERSIONS IN NON-AQUEOUS SOLVENTS

(75) Inventors: Michael T. Nowak; Qingping Chen, both of Simpsonville, SC (US)

(73) Assignee: BIC Corporation, Milford, CT (US)

( * ) Notice: Subject to any disclaimer, the term of this patent is extended or adjusted under 35 U.S.C. 154(b) by 83 days.

(21) Appl. No.: 09/645,417

(22) Filed: Aug. 24, 2000

(51) Int. Cl.⁷ ............................................. C09D 11/20
(52) U.S. Cl. ................ 106/31.15; 106/31.6; 106/31.77; 106/31.86
(58) Field of Search .............................. 106/31.5, 31.6, 106/31.77, 31.86

(56) References Cited

U.S. PATENT DOCUMENTS

| | | | |
|---|---|---|---|
| 3,446,564 A | 5/1969 | Horie | 401/209 |
| 3,455,856 A | 7/1969 | Voedisch | 260/21 |
| 3,533,708 A | 10/1970 | Horie | 401/209 |
| 3,572,954 A | 3/1971 | Cheron | 401/18 |
| 3,753,921 A | 8/1973 | Noetzel et al. | 252/30.1 OR |
| 3,873,218 A | 3/1975 | Yoshida | 401/292 |
| 3,951,555 A | 4/1976 | Wittnebert et al. | 401/217 |
| 4,079,026 A | 3/1978 | Mone | 260/22 CQ |
| 4,671,691 A | 6/1987 | Case et al. | 401/142 |
| 4,726,845 A | 2/1988 | Thompson et al. | 106/25 |
| 5,290,348 A | 3/1994 | Auslander | 106/23 R |
| 5,439,971 A | 8/1995 | Hyche | 524/763 |
| 5,698,614 A | 12/1997 | Ueda et al. | 523/161 |
| 5,849,814 A | 12/1998 | Fujita | 523/161 |
| 5,919,858 A | 7/1999 | Loftin | 524/575 |
| 6,165,609 A | * 12/2000 | Curatolo | 250/365 |

FOREIGN PATENT DOCUMENTS

WO   WO00/20522   4/2000

* cited by examiner

*Primary Examiner*—Helene Klemanski
(74) *Attorney, Agent, or Firm*—Pennie & Edmonds LLP

(57) ABSTRACT

A non-aqueous fluorescent ink composition suitable for use in writing instruments is described comprising a fluorescent pigment dispersion and a high boiling point organic solvent. The ink composition may also include resins, plasticizers, antiskinning agents, lubricants and stabilizers. The fluorescent ink composition exhibits a brilliant appearance in masscolor and when written on paper.

42 Claims, No Drawings

SOLVENT-BASED FLUORESCENT INKS FOR WRITING INSTRUMENTS BASED UPON PIGMENT DISPERSIONS IN NON-AQUEOUS SOLVENTS

FIELD OF INVENTION

The present invention relates to fluorescent ink compositions for writing instruments and writing instruments making use of the ink composition. The ink compositions comprise a fluorescent pigment dispersed in a resin and a high boiling point organic solvent.

BACKGROUND OF INVENTION

Current bright ink pens are either gel ink pens requiring a grease follower and point seal feature or free ink pens wherein the ink viscosity is low (less than 1000 cPs) and a flow control mechanism such as a baffle and/or capillary connectors is required. U.S. Pat. No. 4,671,691 to Case et al. and U.S. Pat. No. 4,726,845 to Thompson et al. disclose aqueous gel ink pens. U.S. Pat. No. 3,446,564 to Horie; U.S. Pat. No. 3,533,708 to Horie; U.S. Pat. No. 3,572,954 to Chevron; U.S. Pat. No. 3,873,218 to Yoshida; and U.S. Pat. No. 3,951,555 to Wittnebert et al. disclose writing instruments utilizing liquid reservoirs employing porous ink feed rods. Disadvantages to using porous ink feed rods include a potential failure to provide a sufficiently continuous flow of ink through the writing instrument tip to the paper.

U.S. Pat. No. 3,753,921 to Noetzel et al. discloses fluorescent pigments dispersed in resins with an average particle size of 0.1 to 5μ for printing inks. Example 1 of the Noetzel patent also discloses that the daylight fluorescent pigment obtained was insoluble in heptane, xylene, ethanol, butanol, butyl acetate and acetone. U.S. Pat. No. 3,753,921 does not disclose the use of these fluorescent pigments in writing instrument inks.

U.S. Pat. No. 3,455,856 to Voedisch discloses a printing ink and a method of manufacturing a pigment dispersion that contains pigmented resin particles suspended in an oil modified alkyd resin vehicle. Fluorescent and non-fluorescent pigments are disclosed. U.S. Pat. No. 3,455,856 does not disclose the organic solvents of the present invention nor does it disclose ink compositions for writing instruments.

U.S. Pat. No. 4,079,026 to Mone discloses oleoresinous base printing inks which contain pigments dispersed in an organic resin and an oil solvent. The pigments can be fluorescent or non-fluorescent Particularly preferred are daylight fluorescent-type dyes and oil solvents with boiling points about 200° C., such as those sold by Magie Bros. Oil Company. The ink is used for planographic or letterpress printing, not for writing instruments.

U.S. Pat. No. 5,290,348 to Auslander discloses non-aqueous fluorescent inks and non-aqueous pigment dispersions stabilized by rosin ester, linseed oil alkyds or other alkyds. The average particle size of the fluorescent pigment is 0.1 to 0.5μ. The fluorescent inks of the Auslander patent fluoresce when exposed to ultraviolet light. U.S. Pat. No. 5,290,348 does not disclose daylight fluorescent pigments or show their use in writing instrument inks.

U.S. Pat. No. 5,849,814 to Fujita discloses an eraseable ink composition for writing boards. The composition comprises a pigment, a pigment dispersion resin, non-aqueous ambient temperature non-volatile liquid removal agent and a non-aqueous ambient temperature volatile organic solvent, wherein the amount of pigment dispersion resin relative to pigment is from about 2 to about 10%. Pigments disclosed are fluorescent and non-fluorescent pigments. U.S. Pat. No. 5,849,814 discloses the use of a volatile solvent at ambient temperature. Further, it states that the ink composition of Fujita is superior in time-erasion performance independent of the surface of the writing board. U.S. Pat. No. 5,849,814 does not disclose ink compositions for writing instruments, nor does it disclose high boiling point organic solvents, nor does it disclose writing surfaces other than writing boards.

U.S. Pat. No. 5,919,858 to Loftin discloses erasable ink compositions comprising an aqueous-based marking ink comprising water, a colorant and a latex emulsion comprising a styrene-butadiene copolymer having a styrene content of less than about 35%. The colorant may be a fluorescent pigment with a particle size of less than 3 microns. U.S. Pat. No. 5,919,858 does not disclose the non-aqueous compositions of the present invention.

U.S. Pat. No. 5,698,614 to Ueda et al. discloses a fluorescent ink composition comprising (1) an organic solvent comprising propylene glycol monomethyl ether, (2) a solution type fluorescent pigment dissolved in the organic solvent comprising propylene glycol monomethyl ether and (3) a ketone resin. The homogeneous ink composition of Ueda is particularly suitable for use in marking pens which have an ink reservoir composed of a bundle of fibers, wherein the ink composition is supplied from the ink reservoir by making use of capillary phenomenon. U.S. Pat. No 5,698,614 does not disclose the use of fluorescent pigments dispersed in a resin or the bright color effect within the transparent or translucent ink tube of a writing instrument or the heterogeneous ink compositions of the present invention.

There is a need for a bright ink writing instrument that does not require an aqueous gel ink or a free ink pen design which requires a flow control mechanism. This invention overcomes these deficiencies.

SUMMARY OF INVENTION

The ink of the present invention discloses a bright fluorescent ink composition that can be delivered in a conventional writing instrument. In particular, if the writing instrument incorporates a transparent or translucent tube (or member) mounted within a transparent or translucent barrel, the ink composition of the present invention exhibits a unique brilliant appearance. More particularly, when the ink of the present invention is written on paper, it exhibits the same brilliance or bright appearance on paper as in the ink containing tube member of the writing instrument.

In one embodiment of the invention, a non-eraseable fluorescent ink composition for a writing instrument comprises a fluorescent pigment dispersed in a resin and a high boiling point organic solvent. Accordingly, the ink compositions of the present invention are heterogeneous, not homogeneous.

Preferably, the writing instrument is a ballpoint pen.

The fluorescent pigment may be used alone or in the form of a mixture of two or more fluorescent pigments. Preferably, the fluorescent pigment is present in the ink composition in amounts from about 0.1 to about 60 weight percent of the ink composition.

The viscosity of the ink compositions of the present invention is that usable for a writing instrument. Preferably the viscosity of the ink composition of the present invention is less than 500,000 cPs at 20° C. More preferably the viscosity of the ink composition of the present invention is from about 1000 to about 50,000 cPs at 20° C.

The resin in which the fluorescent pigment is dispersed may be present alone or as a mixture of resins. Preferably, the resin is an alkyd resin, more preferably, the alkyd resin is an oil-modified alkyd resin.

The organic solvent may be used alone or in the form of a mixture between two or more organic solvents. Preferably, the boiling point of the organic solvent is above 100° C. Examples of solvents include, but are not limited to, hydrocarbons, alcohols, polyols, polyol ethers, ketones, pyrrolidones, lactones or mixtures thereof. Preferably, the hydrocarbon solvent is selected from the group consisting of aliphatic hydrocarbons, napthenic hydrocarbons and aromatic hydrocarbons and mixtures thereof. Preferably, the organic solvent is present in an amount from about 5 to about 90 weight percent of the ink composition. Most preferably, the organic solvent is present in an amount from about 20 to about 65 weight percent of the ink composition.

In another embodiment of the invention, a fluorescent ink composition comprises a fluorescent pigment dispersion in a high boiling point solvent and an antioxidant. Preferably, the antioxidant is present in an amount from about 0.1 to about 30 weight percent of the ink composition. More preferably, the antioxidant is present in an amount from about 0.1 to about 10 weight percent of the ink composition. Preferably, the antioxidant is selected from the group consisting of tocopherals, butylated hydroxy toluene, eugenol and hydroquinone.

In another embodiment of the invention, a fluorescent ink composition comprises a fluorescent pigment dispersion in a high boiling point nonaqueous solvent and a second resin. The second resin may be used alone or in the form of a mixture of two or more resins. Preferably, the second resin is present in an amount from about 0.1 to about 50 weight percent of the ink composition. More preferably, the second resin is present in an amount from about 1 to about 20 weight percent of the ink composition.

Preferably, the second resin is selected from the group consisting of polyesters, polystyrene, high impact polystyrene, styrene copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, rosin esters, hydrocarbon resins and copolymers, grafts, blends, and mixtures thereof.

In another embodiment of the present invention, a fluorescent ink composition comprises a pigment dispersion in a high boiling point solvent and a stabilizer. The stabilizer may be used alone or in the form of a mixture of two or more stabilizers. Preferably, the stabilizer is hydroquinone. Preferably, the stabilizer is present in the ink composition from about 0.1 to about 30 weight percent of the ink composition. More preferably, the stabilizer is present in an amount from about 0.1 to about 10 weight percent of the ink composition.

In another embodiment of the invention, the fluorescent ink composition comprises a fluorescent pigment dispersion in a high boiling point solvent and a plasticizer. The plasticizer may be used alone or in the form of a mixture of two or more plasticizers. Preferably, the plasticizer is 2,2,4-trimethyl-1,3-pentanediol diisobutyrate. Preferably, the plasticizer is present in an amount from about 0.1 to about 40 weight percent of the ink composition, more preferably, from about 1 to about 20 weight percent and most preferably, from about 2 to about 15 weight percent.

Ink compositions of the present invention may further comprise lubricants, metal deactivators, chelating agents, dispersing agents and antiskinning agents, solely or mixtures thereof. Preferably, the antiskinning agent is present in an amount from about 0.1 to about 2 weight percent of the ink composition. The antiskinning may be used alone or in the form of a mixture of two or more antiskinning agents. Preferably, the antiskinning agent is an oxime. Most preferably, the antiskinning agent is methyl ethyl ketoxime. The lubricant may be used alone or in the form of a mixture of two or more lubricants. Preferably, the lubricant is selected from the group consisting of alcohol esters, amides, polyol esters, fatty acids, fatty alcohols, silicones, liquid polyolefins and fatty acid metal salts. Most preferably, the lubricant is liquid polyethylene wax.

Preferably, the lubricant is present in an amount from about 0.1 to about 30 weight percent of the ink composition. More preferably, the lubricant is present in an amount from about 1 to about 15 weight percent of the ink composition. The total amount of such additional components is typically from about 0.1 weight percent to about 30 weight percent and, preferably, from about 0.1 weight percent to about 10 weight percent.

In another embodiment of the present invention, a writing instrument comprises an ink storage member or tube containing inks of the present invention. An ink storage member or tube may be made from any of the following polymer materials: polyesters, polystyrene, high impact polystyrene, styrene-butadiene copolymers, impact modified styrene-butadiene copolymer, styrene acrylonitrile copolymers, acrylonitrile butadiene copolymers, polyisobutylene, vinyl, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, such as nylon, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, fluoropolymers, copolymers, grafts, blends, or mixtures thereof. Also, any ink member or tube made from the polymers listed above may also be modified by a surface treatment such as fluorination, corona oxidation and the like to improve performance of the ink delivery. Preferably, the ink storage member is made of a polymer material such as fluoropolymer, vinyl. nylon and fluorinated polypropylene.

Many colors and blends are envisioned in the present invention. Further, the inks of the present invention exhibit a smooth writing performance.

DESCRIPTION OF PREFERRED EMBODIMENTS

As used herein, the term "fluorescence" refers to the emission of visible light after absorbing daylight radiation.

As used herein, the term "fluorescent pigment dispersion" is an insoluble fluorescent colorant dispersed in resin or mixture of resins. The fluorescent colorant exhibits the phenomenon of fluorescence in the visible region of the spectrum. Because the colorant is dispersed in a resin, the fluorescent pigment dispersion is a heterogeneous ink composition, as opposed to a homogeneous ink composition.

As used herein, the term "alkyd resin" is a synthetic resin formed by the condensation of polyhydric alcohols, such as glycerol, and polybasic acids, such as phthalic anhydride. As used herein, the term "oil-modified alkyd resin" is an alkyd resin in which the polybasic acid is substituted in part by a monobasic acid.

As used herein, the term "masscolor" is the color when viewed by reflected light of an ink of such thickness to obscure completely the background.

As used herein, the term "stabilizer" is an additive for inks to prevent the discoloration and changes in the viscosity of the ink with the passage of time. Examples of stabilizers are dihydroxybenzene derivatives, hydroxybenzenes, such as butylated hydroxy toluene, and hydroquinone.

As used herein, the term "plasticizer" is an organic additive and is used to make the ink film more flexible. Examples of plasticizers are nonvolatile organic liquids and low melting solids, such as phthalate, adipate and sebacate esters, tricresyl phosphate and castor oil.

As used herein, the term "antiskinning agent" is a liquid antioxidant used to inhibit the formation of an oxidized film on the exposed surface of the ink.

As used herein, the term "high boiling point solvent" is a solvent with a boiling point above 100° C. or 212 F. Preferably, the boiling point is from about 200° C. to 700° C. Preferably, the organic solvent is present in an amount from about 5 to about 50 weight percent of the ink composition. Preferred solvents are Magiesol solvents (Magie Brothers, Franklin Park, Ill.) such as Magiesol 470 oil, Magiesol 52 oil, Magiesol 62 oil, and Magiesol 60. Magiesol 470 oil is a sweetened middle distillate with a boiling point ranging from 230 to 280° C. Magiesol 52 oil is a blend of sweetened middle distillate and technical white oil with a boiling point from 270 to 310° C. Magiesol 62 and 60 are technical grade white oils with boiling points from 300° C. to 400° C.

The term "about," as used herein in connection with one or more numbers or numerical ranges, should be understood to refer to all such numbers, including all numbers in a range.

The preferred compositions comprise a fluorescent pigment dispersion in a high boiling point nonaqueous solvent. A fluorescent pigment dispersion is an insoluble fluorescent colorant dispersed in a liquid medium. Any resin may be used, preferably an alkyd resin, most preferably, an oil modified alkyd resin. The preparation of a fluorescent pigment dispersion is known to one skilled in the art. Examples of making a fluorescent pigment dispersion are disclosed in U.S. Pat. No. 5,439,971 to Hyche and U.S. Pat. No. 3,455,856 to Voedisch.

Any daylight fluorescent colorant can be used in the present invention. Examples of daylight fluorescent compounds are the rhodamine, fluorescein, coumarin, naphthalimide, benzoanthene and acridine families. Suppliers of fluorescent colorants are Radiant Color Company (San Francisco, Calif.), Day-Glo Color Corp. (Cleveland, Ohio), Sun Chemical Co. (Cincinnati, Ohio). Sinloihi Co. Ltd. (Tokyo, Japan), Swada (London, England), Mikuni Color Works Ltd. (Himaji, Japan), Matsui International Co, Inc (Japan), Tayca Corporation (Japan), and Nippon Keiko Color Company (Japan). Examples of suitable fluorescent pigments dispersed in a resin available commercially are "Lumikol" (Nippon Keiko Kagaku Ltd.), Radiant Color (San Francisco, Calif.), and Sun Chemical (Cincinnati, Ohio).

Resins may be used alone or in the form of a mixture to two or more resins. Resins suitable for use as the second resin in the present invention include, but are not limited to, thermoplastic, thermosetting, addition and condensation polymers. Illustrative examples include, but are not limited to, polyesters, polystyrene, high impact polystyrene, styrene copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyethylene, high density polyethylene, polypropylene, polyurethanes, rosin esters, hydrocarbon resins, copolymers, grafts, blends or mixtures thereof. The copolymers and blends of these polymers are well known to those skilled in the art, as are polymers which may serve as a backbone or a grafted polymer in graft polymers.

Alkyd resins are preferred resins for use in the fluorescent pigment dispersion of the present invention. Examples of alkyd resins useful in this invention are alkyd resins from Akzo Nobel (Matteson, Ill.), such as, AKA 1317, a #3 soya alkyd, AKA1275, a #7 super fluorite alkyd, AKA 1235, a high molecular weight #5 alkyd, AKA 1163, a #7 soya alkyd, AKA 1162, a metal decorating alkyd, AKA 1110, a #3 super fluorite alkyd, AKA 1109, a #1 super fluorite alkyd and AKA 1100, a #00 litho alkyd. More preferably the alkyd resins are oil modified or fatty acid modified alkyds.

Antioxidants may be used alone or in the form of a mixture to two or more antioxidants. Examples of antioxidants include, but are not limited to, are (1) hindered phenols [such as Alvinox 100 made by 3V inc. in Charlotte, N.C. or BNX 1000 made by Mayzo Inc in Norcross, Ga.) or BHT (butylated hydroxy toluene) made by Eastman Chemical Co. or Vanox SKT made by Vanderbilt Chemical Co in Connecticut], (2) alkylidene bis, tris, and polyphenols [such as the Cyanox series (425, 1790, 2246) made by CYTEC in Perrysburg, Ohio], (3) thio bis, tris and polyalkylated phenols [such as Irganox 1035 made by Ciba Geigy in Basel, Switzerland], (4) amines [such as PTZ phenothiazine made by Zeneca Specialties in England or the Naugard series (A, J, Q, SA, 445) made by Uniroyal Chemical Co in Connecticut], (5) esters [such as the Argus series (DLTDP, DSTDP, DMTDP, DTDTDP) Witco Polymer Additives in Greenwich, Conn.], (6) organic phosphites and phosphates [such the Albrite series (BTD HP, DBHP, DLHP) made by Albright & Wilson located in Richmond, Va.], (7) propyl gallate made by Eastman Chemical Co in Tennessee, (8) hydroquinone made by Monsanto Chemical Co in St. Louis, Mo., (9) tocopherol, such as vitamin E and (10) eugenol (oil of cloves). Preferred antioxidants are Vitamin E sold by A.D.M. (Decatur, Ill.), BHT sold by Eastman Chemical (Kingsport, Tenn.) and eugonol sold by Aldrich Chemical Co. (Milwaukee, Wis.). Most preferred is BHT. Preferably, the antioxidant is present in the ink composition in amounts from about 0.1 to about 30 weight percent, most preferably from about 0.1 to about 10 weight percent.

UV absorbers may be used alone or in the form of a mixture to two or more UV absorbers. Examples of UV absorbers and light stabilizers include, but are not limited to, (1) 2-(2'-hydroxyphenyl)-benzotriazoles; (2) esters of substituted or unsubstituted benzoic acids, (3) 2-hydroxybenzophenones, (4) acrylates, (5) nickel compounds, such as nickel complexes of 2,2'-thiobis-[4-(1, 1,3,3-tetramethylbutyl)-phenol], nickel dibutyldithiocarbamate, nickel salts of monoalkyl 4-hydroxy-3,5-di-tert-butylbenzylphosphonates, nickel complexes of ketoximes, or nickel complexes of 1-phenyl-4-lauryl-5-hydroxypyrazole, (6) sterically hindered amines, such as, bis-(2,2,6,6 -tetramethylpiperidyl) sebacate, and bis-(1,2,2,6,6-pentamethylpiperidyl)sebacate, and bis-(1,2, 2,6,6-pentamethylpiperidyl) n-butyl-3,5-di-tert-butyl-4-hydroxybenzylmalonate; (7) oxamides and (8) 2-(2 hydroxyphenyl)-1,3,5-triazines.

Plasticizers may be used alone or in the form of a mixture to two or more plasticizers. Examples of plasticizers for use in this invention include, but are not limited to, derivatives of abietic, acetic acid, adipic acid, azelaic acid, benzoic acid, butiene, polyphenol, citric acid, epoxy, fumaric acid, glutaric acid, gycerine, glycol, linear dibasic acid, petroleum, isobutyric, isophthalte, lactam, maleic acid, myristic acid, nitrile, oleic acid, palmitic acid, paraffin, pelargonic acid, pentaerythritol, phenoxy, phosphoric acid, polyester, ricinoleic acid, sebacic acid, stearic acid, styrene, sucrose, sulfonic acid, tall oil, and trimellitate acid. Preferably the plasticizer is 2,2,4-trimethyl-1,3-pentadiol diisobutyrate ("TXIB") sold by Eastman Chemical Co. (Kingsport, Tenn.). Preferably, the plasticizer is present in the ink composition in amounts from about 0.1 to about 40 weight percent, more preferably from about 1 to about 20 weight percent, most preferably from about 2 to about 15 weight percent.

Antiskinning agents may be used alone or in the form of a mixture to two or more antiskinning agents. An example of an antiskinning agent includes, but is not limited to the oxime family of organic compounds. Preferably, the anti-skinning agent is methyl ethyl ketoxime sold by DMG Americas (Westlake, Ohio). Preferably the anti-skinning agent is present in the ink composition in amounts from about 0.1 to about 2 weight percent.

Lubricants may be used alone or in the form of a mixture to two or more lubricants. Examples of lubricants include, but are not limited to, (1) alcohol esters [tradename Flexricin P-1, P-4, P-6 made by CasChem in Newark, N.J.], (2) amides [tradename Crodamide EBS, EBO, ER made by Croda Universal Ins in Arlington, Tex.], (3) polyol esters [such as tradename Glycolube P made by Lonza in Fair Lawn, N.J.], (4) fatty acids [such as tradename Croacid made by Croda], (5) fatty alcohols [such as tradename Unilin 350, 425, 550 made by Petrolite Company in Oklahoma], (6) silicones [such as tradename 200, 203, MB50-001 fluids made by Dow Corning in Midland Michigan], (7) liquid polyolefins [such as VERSAFLOW made by Shamrock Chemical Co in Newark, N.J.] and (8) fatty acid metal salts such as zinc stearate made by Witco Corp in Greenwich, Conn. Preferably the lubricant is liquid polyethylene wax (Versaflow) available from Shamrock Chemicals Co. (Newark, N.J.). Preferably, the lubricant is present in the ink composition in amounts from about 0.1 to about 30 weight percent. More preferably, the lubricant is present in the ink composition in amounts from about 1 to about 15 weight percent.

Metal deactivators may be used alone or in the form of a mixture to two or more metal deactivators. Examples of metal deactivators include, but are not limited to, N,N'-diphenyloxamide, N-salicylal-N'-salicyloylhydrazine, N,N'-bis-(salicyloyl)-hydrazine, N,N'-bis-(3,5-di-tert-butyl-4-hydroxyphenylpropionyl)-hydrazine, 3-salicyloylamino-1,2,4-triazole, bis-(benzylidene)-oxalic acid dihydrazide, tradenames Citrosol 50W, 50T, 50E made by Pfizer Chemical Co in New Haven, Conn.; Cheelox HE-24, NTA-14 made by GAF Corporation in New Jersey and Chel DM-41, DPTA, Irganox 1024 made by Ciba Geigy in Basel, Switzerland).

Dispersing agents may be used alone or in the form of a mixture of two or more dispersing agents. Dispersing agents may be either anionic, nonionic or amphoteric. The anionic dispersant usable includes, for instance, sulfonated fatty acid ester such as dioctyl sodium sulfosuccinate, higher alcohol sulfate, polyoxyethylene alkyl phenyl ether sulfate, alkyl aryl sulfonate or olefin sulfonate. The nonionic dispersant usable in the present invention includes, for instance, polyoxyethylene ether compound such as polyoxyethylene alkyl ether or polyoxyethylene alkyl phenyl ether, polyhydric alcohol fatty acid ester or polyhydric alcohol fatty acid ester polyoxyethylene ether. The ink composition may contain a dispersing agent in an amount of not more than about 10 weight percent, preferably in the range of about 0.1 weight percent to about 5 weight percent, based on the ink composition.

Additional components which can be added to the ink compositions of the present invention include fillers, U.V. stabilizers, surfactants, non-fluorescent dyes, optical brighteners, and heat stabilizers. The total amount of such additional components is typically from about 0.1 weight percent to about 30 weight percent and preferably, from about 1 weight percent to about 15 weight percent.

In another embodiment of the present invention, a writing instrument comprises an ink storage member or tube containing inks of the present invention. An ink storage member or tube may be made from any of the following polymer materials: polyesters, polystyrene, high impact polystyrene, styrene-butadiene copolymers, impact modified styrene-butadiene copolymer, styrene acrylonitrile copolymers, acrylonitrile butadiene copolymers, polyisobutylene, vinyl, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, such as nylon, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, fluoropolymers, copolymers, grafts, blends or mixtures thereof. Also, any ink member or tube made from the polymers listed above may also be modified with surface treatments such as fluorination, corona oxidation and the like to improve performance of the ink delivery. Preferably, the ink storage member is made of a polymer material such as fluoropolymer, vinyl, nylon and fluorinated polypropylene. Most preferably, the polymer material is a fluoropolymer such as fluorinated ethylenepropylene or "FEP," from Dupont.

EXAMPLES

Example 1

Alkyd/Fluorescent Pigment Dispersions

As shown in Table 1, the following formulations are examples of inks made from alkyd fluorescent pigment dispersions using Magiesol 52 to reduce viscosity. The viscosities of the inks disclosed in Table 1 range from about 5000 to about 7000 cPs.

TABLE 1

| COMPONENTS | A | B | C | D | E | F | G | H | I | J |
|---|---|---|---|---|---|---|---|---|---|---|
| Visiprint* VF GR 0651 (green) | 100 pbw | 100 | | | | | | | | |
| Visiprint VF YE 0650 | | | 100 | | | | | | | |
| Visiprint VF MG 0658 (magenta) | | | | 100 | | | | | | |
| Visiprint VF OY 0622 (orange) | | | | | 100 | | | | | |
| Visiprint VF BL 0659 (blue) | | | | | | 100 | | | | |
| Visiprint VF OR 0654 | | | | | | | 100 | | | |
| Visiprint VF PK 0657 (pink) | | | | | | | | 100 | | |
| Visiprint VF CH 0620 (chartreuse) | | | | | | | | | 100 | |
| Visiprint VF RD 0625 (red) | | | | | | | | | | 100 |
| BHT** | 1 | | | | | | | | | |
| Magiesol 52 solvent*** | 20.5 | 20 | 20 | 23.5 | 20.0 | 20.5 | 20 | 20 | 22.1 | 20.25 |

*Proprietary fluorescent pigment dispersions available from Radiant Color Company
**BHT = butylated hydroxy toluene
***High boiling point organic solvent (boiling point = 520 to 550 F) available from Magie Brothers
Note:
pbw means parts by weight Example 2
Fluorescent Pigment Dispersions with Mapiesol 52 and Stabilized with Hydroquinone As shown in Table 2, the following ink is an example of using a high boiling point solvent (Magiesol 52) to reduce the fluorescent pigment viscosity plus adding a stabilizer (hydroquinone) to improve shelf life. Magiesol 52, a high boiling point organic solvent from Magie Brothers, is added stepwise until the viscosity of the ink composition is 7100 cPs.

TABLE 2

| COMPONENTS | |
|---|---|
| Sunbrite Strong Magenta B51-UK 55* | 55.45 pbw |
| Magiesol 52 | 10.60 |
| Hydroquinone | 0.57 |

*Fluorescent pigment dispersion available from Sun Chemical

Example 3
Fluorescent Pigment Dispersions with TXIB and Stabilized with BHT

As shown in Table 3, the following is an example of using a plasticizer to reduce the viscosity of the pigment dispersion coupled with a stabilizer, TXIB, and an antioxidant, BHT. The plasticizer, TXIB is added step-wise to achieve a final viscosity of 27,000 cPs.

TABLE 3

| COMPONENTS (all parts by weight) | |
|---|---|
| Day-Glo SFB 802 (Green) | 53.09 pbw |
| TXIB* | 9.71 pbw |
| BHT** | .56 pbw |

*TXIB = 2,2,4-Trimethyl-1,3-Pentanediol Diisobutyrate
**BHT = butylated hydroxy toluene All patents cited in the foregoing text are expressly incorporated herein by reference in their entirety.

It will be understood that the claims are intended to cover all changes and modifications of the preferred embodiments of the invention, herein chosen for the purpose of illustration, which do not constitute a departure from the spirit and scope of the invention.

We claim:

1. A heterogeneous, non-erasable fluorescent ink composition for a writing instrument comprising a fluorescent pigment dispersed in a resin and a high boiling point organic solvent, wherein the ink composition has a viscosity usable for a writing instrument, and the ink composition exhibits a bright appearance on paper and within an ink containing member of the writing instrument.

2. A fluorescent ink composition of claim 1, wherein the viscosity is less than 500,000 cPs at 20° C.

3. A fluorescent ink composition of claim 2, wherein the ink composition as a viscosity from about 1000 to about 50,000 cPs at 20° C.

4. A heterogeneous, non-erasable fluorescent ink composition for a writing instrument comprising a fluorescent pigment dispersed in a resin and a high boiling point organic solvent, wherein the ink composition has a viscosity usable for a writing instrument.

5. The ink composition of claim 1, wherein the resin is an alkyd resin.

6. The ink composition of claim 5, wherein the alkyd resin is an oil modified alkyd resin.

7. The ink composition of claim 1, further comprising a second resin.

8. The ink composition of claim 7, wherein the second resin is present in an amount from about 0.1 to about 50 weight percent of the ink composition.

9. The ink composition of claim 8, wherein the second resin is present in an amount from about 1 to about 20 weight percent of the ink composition.

10. The ink composition of claim 7, wherein the second resin is selected from the group consisting of polyesters, polystyrene, high impact polystyrene, styrene copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, rosin esters, hydrocarbon resins and copolymers, grafts, blends, and mixtures thereof.

11. The ink composition of claim 1, wherein the organic solvent has a boiling point above 100° C.

12. The ink composition of claim 11, wherein the organic solvent is selected from the group consisting of hydrocarbons, alcohols, polyols, polyol ethers, ketones, pyrrolidones, lactones and mixtures thereof.

13. The ink composition of claim 12, wherein the hydrocarbon solvent is selected from the group consisting of aliphatic hydrocarbons, naphthenic hydrocarbons, aromatic hydrocarbons and mixtures thereof.

14. The fluorescent ink composition of claim 1, wherein the organic solvent is from about 5 to about 90 weight percent of the ink composition.

15. The fluorescent ink composition of claim 14, wherein the organic solvent is from about 20 to about 65 weight percent of the ink composition.

16. The ink composition of claim 1 further comprising a stabilizer.

17. The ink composition of claim 16, wherein the stabilizer is present in an amount from about 0.1 to about 30 weight percent of the ink composition.

18. The ink composition of claim 17, wherein the stabilizer is present in an amount from about 0.1 to about 10 weight percent of the ink composition.

19. The ink composition of claim 1, further comprising an antioxidant.

20. The ink composition of claim 19, wherein the antioxidant is selected from the group consisting of tocopherals, butylated hydroxy toluene, eugenol and hydroquinone.

21. The ink composition of claim 19, wherein the antioxidant is present in an amount from about 0.1 to about 30 weight percent of the ink composition.

22. The ink composition of claim 1 further comprising a plasticizer.

23. The ink composition of claim 22, wherein the plasticizer is 2,2,4-trimethyl-1,2-pentanediol diisobutyrate.

24. The ink composition of claim 22, wherein the plasticizer is present in amounts from about 0.1 to about to about 40 weight percent of the ink composition.

25. The ink composition of claim 24, wherein the plasticizer is present in amounts from about 1 to about 20 weight percent of the ink composition.

26. The ink composition of claim 25, wherein the plasticizer is present in amounts from about 2 to about 15 weight percent.

27. The ink composition of claim 1, further comprising an antiskinning agent.

28. The ink composition of claim 27, wherein the antiskinning agent is an oxime.

29. The ink composition of claim 27, wherein the antiskinning agent is methyl ethyl ketoxime.

30. The ink composition of claim 27, wherein the antiskinning agent is present in amounts from about 0.1 to about 2 weight percent of the ink composition.

31. The ink composition of claim 1, further comprising a lubricant.

32. The ink composition of claim 31, wherein the lubricant is selected from the group consisting of alcohol esters, amides, polyol esters, fatty acids, fatty alcohols, silicones, liquid polyolefins and fatty acid metal salts.

33. The ink composition of claim 31, wherein the lubricant is liquid polyethylene wax.

34. The ink composition of claim 31, wherein the lubricant is present in an amount from about 0.1 to about 30 weight percent of the ink composition.

35. The ink composition of claim 34, wherein the lubricant is present in an amount from about 1 to about 15 weight percent of the ink composition.

36. The fluorescent ink composition of claim 1, wherein the fluorescent pigment is present in the ink composition in an amount from about 0.1 to about 60 weight percent of the ink composition.

37. A writing instrument comprising an ink storage member containing a heterogeneous, non-erasable fluorescent ink composition for a writing instrument comprising a fluorescent pigment dispersed in a resin and a high boiling point organic solvent.

38. The writing instrument of claim 37, wherein the ink storage member is made from a polymer material selected from the group consisting polyesters, polystyrene, high impact polystyrene, styrene-butadiene copolymers, impact modified styrene-butadiene copolymer, styrene acrylonitrile copolymers, acrylonitrile butadiene copolymers, polyisobutylene, vinyl, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, fluoropolymer and copolymers, grafts, blends, and mixtures thereof.

39. The writing instrument of claim 38, wherein the polymer material is modified by a surface treatment using fluorination or corona oxidation.

40. The writing instrument of claim 37, wherein the ink storage member is made from a polymer material selected from the group consisting of fluoropolymers, vinyl, nylon and fluorinated polypropylene.

41. The writing instrument of claim 37, wherein the writing instrument is usable on ink-absorbing surfaces.

42. The writing instrument of claim 37, wherein the writing instrument is a ballpoint pen.

* * * * *

UNITED STATES PATENT AND TRADEMARK OFFICE
CERTIFICATE OF CORRECTION

PATENT NO. : 6,425,948 B1
DATED : July 30, 2002
INVENTOR(S) : Nowak et al.

It is certified that error appears in the above-identified patent and that said Letters Patent is hereby corrected as shown below:

Column 10,
Line 45, "as" should be -- has --.

Column 11,
Line 58, after "percent", please insert -- of the ink composition --.

Signed and Sealed this

Eighth Day of March, 2005

JON W. DUDAS
*Director of the United States Patent and Trademark Office*